United States Patent
Arnold et al.

(10) Patent No.: US 7,188,891 B2
(45) Date of Patent: Mar. 13, 2007

(54) UNIVERSAL GLAD HAND BRACKET DESIGN MOUNTED TO MUFFLER STANCHION CROSS BRACE

(75) Inventors: Richard A. Arnold, Fort Wayne, IN (US); Darrell S. Bowman, Spencerville, IN (US); Anthony J. Buchman, Paulding, OH (US); Michael S. Freed, Fort Wayne, IN (US); Robert J. Haverstick, Leo, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 177 days.

(21) Appl. No.: 10/940,584

(22) Filed: Sep. 14, 2004

(65) Prior Publication Data

US 2006/0055205 A1    Mar. 16, 2006

(51) Int. Cl.
*B60R 27/00* (2006.01)

(52) U.S. Cl. .................................. 296/190.01

(58) Field of Classification Search ........... 296/190.01, 296/190.08, 190.09
See application file for complete search history.

(56) References Cited

U.S. PATENT DOCUMENTS

| 4,097,840 | A | * | 6/1978 | Chappelle | .................... 340/431 |
| 4,671,013 | A | * | 6/1987 | Friese et al. | ............. 296/146.2 |
| 5,845,745 | A | * | 12/1998 | Lane | .......................... 187/259 |

* cited by examiner

*Primary Examiner*—Lori L. Lyjak
(74) *Attorney, Agent, or Firm*—Gerald W. Askew; Jeffrey P. Calfa; Susan L. Lukasik

(57) ABSTRACT

A mounting system for securing brake hoses and electrical cables located to the rearward of a mobile vehicle cab. The mobile vehicle's cab is engaged to a chassis. The chassis has exhaust stanchions rearward of the cab relative to vehicle forward movement. The exhaust stanchions are supported by braces. Attached to these braces, or integrated into them, are mounting points for interchangeable brackets. One carries a "glad hand" and electrical connector hanger, and the other carries a hose tender.

4 Claims, 13 Drawing Sheets

Figure 1:
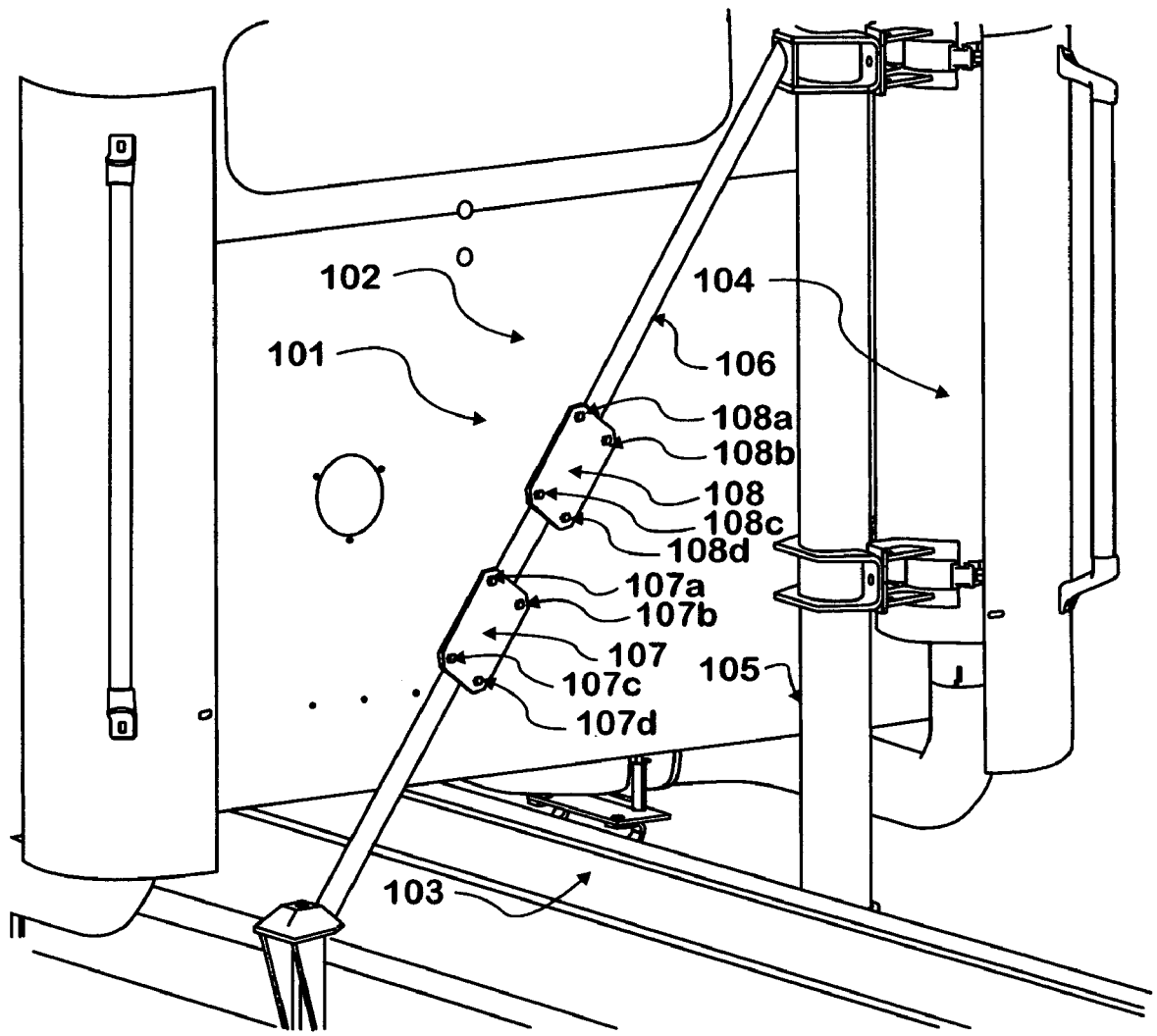

SINGLE EXHAUST,
MOUNTING PLATES ONLY

SINGLE EXHAUST,
MOUNTING PLATES ONLY

DUAL EXHAUST,
MOUNTING PLATES ONLY

DUAL EXHAUST, MOUNTING PLATES, BRACKETS, & HANGERS, ONE ON EACH PLATE

DUAL EXHAUST,
MOUNTING PLATES,
BRACKETS, & HANGERS,
BOTH ON UPPER PLATE

DUAL EXHAUST,
MOUNTING PLATES,
BRACKETS, & HANGERS,
ONE ON EACH PLATE,
HOSES & CONNECTORS
SHOWN

DUAL EXHAUST,
MOUNTING PLATES,
BRACKETS, & HANGERS,
BOTH ON UPPER PLATE
HOSES & CONNECTORS
SHOWN

GLAD HAND HANGER
BRACKET & GLAD
HAND HANGER

CANTED GLAD HAND
HANGER BRACKET &
GLAD HAND HANGER

HOSE TENDER BRACKET AND HOSE TENDER DEVICE

DUAL EXHAUST,
MOUNTING PLATES ONLY
ONE ON EACH BRACE

DUAL EXHAUST,
SINGLE MOUNTING
PLATE ONLY

DUAL EXHAUST,
MOUNTING PLATES WITH
STUDS ONLY

DUAL EXHAUST,
INTEGRATED MOUNTING
PLATES ONLY

UNIVERSAL GLAD HAND BRACKET DESIGN MOUNTED TO MUFFLER STANCHION CROSS BRACE

BACKGROUND OF INVENTION

This invention relates to a bracket and mounting system for securing brake hoses and electrical cables located to the rearward of a mobile vehicle cab. More specifically, the bracket and mounting system is configured in such a way that it can be adapted for use with vehicles wherein these connections are accessed either from ground level or from deck plates located to the rearward of the cab.

PRIOR ART

Commercial highway tractors are provided with air hoses and electrical cables intended to be connected to a semi-trailer, upon coupling of the tractor thereto. The air hoses provide air pressure for braking and sometimes suspension operation, whereas the electrical cables provide electrical current for vehicle lighting and signaling, as well as electrical signals for the vehicle antilock braking system, if so equipped. The fittings located at the connecting end of the air hoses are commonly known as "glad hands". When a tractor is uncoupled from a semi-trailer, the electrical cables and air hoses, and their connectors and "glad hand" fittings, are secured to a mounting system at or near the rearward side of the vehicle cab. In this manner, the air hoses and electrical cables are prevented from dragging on the ground, or from becoming entangled with the tractor's chassis components.

The prior art mounting system was either affixed to the rearward side of the cab itself, panels to the rearward of the vehicle cab, known as cab extenders, or directly to the frame of the vehicle. In the case of the mounting system affixed directly to the frame of the vehicle, the mounting system took the form of an independent vertical stanchion configured in such a way as to raise the mounting points to a convenient level. In all embodiments, the prior art mounting system incorporated a number of disadvantages. In the case of the mounting system that was affixed to the rearward side of the vehicle cab or to the cab extenders, the points at which the system was affixed were prone to metal oxidization and corrosion. In the case of the mounting system characterized by a vertical stanchion mounted to the frame of the vehicle, the natural tendency for the stanchion to vibrate and resonate caused structural reliability issues.

All types of mounting systems suffered from design complexity stemming from the need to place the air hoses and electrical cables, and their "glad hand" fittings and electrical connectors, at an accessible location. The necessary placement of the hoses, cables, connectors, and "glad hands" depended upon whether the vehicle was equipped with deck plates, thus allowing the operator to climb up to an elevated position, or was not equipped with deck plates, forcing the operator to access the vehicle connections from ground level. The necessary variations in hardware and assembly resulted in increased cost of the overall vehicle.

SUMMARY OF INVENTION

A primary object of the invention is to provide a durable mounting system for highway tractor air hoses, electrical cables, and their associated "glad hand" fittings and electrical connectors. The new mounting system utilizes commercially available "glad hand" and electrical connector hangers for storing the "glad hands" and connectors, and commercially available hose tenders for flexibly supporting and retaining the hoses and electrical cables at or near their midpoints. The new system is independent of the vehicle cab and cab extenders, thus eliminating a source of oxidization and corrosion. The new system does not rely upon an independent stanchion, thus eliminating a source of durability issues. Instead, the new mounting system is affixed to an existing brace, which in turn supports an existing exhaust support stanchion. This existing exhaust support stanchion is present whether the vehicle is configured to include a single vertical exhaust or a dual vertical exhaust.

Additionally, the new mounting system provides two mounting locations, an upper location disposed toward the longitudinal centerline of the vehicle, and a lower location disposed toward the left hand or driver's side of the vehicle. The new system is configured in such a way that the hardware is common between upper and lower mounting locations. This common hardware consists of two separate brackets, one for attaching the hose tender device, and another for attaching the electrical connector and "glad hand" hanger. Moreover, these brackets may be attached in multiple configurations. Common configurations include both brackets attached to the upper mounting location, and the hose bracket mounted at the upper location with the "glad hand" bracket attached to the lower mounting location. Other configurations are possible utilizing the new mounting system, but are not commonly employed.

Finally, in order to provide for ease of accessibility, the "glad hand" bracket incorporates an angled design, so that the "glad hand" fittings are presented to the operator in a manner that allows for comfortable and ergonomic grasping thereof.

DRAWINGS

FIG. 1—A rear view of a vehicle made in accordance with a first embodiment of the invention.

Figure 2:
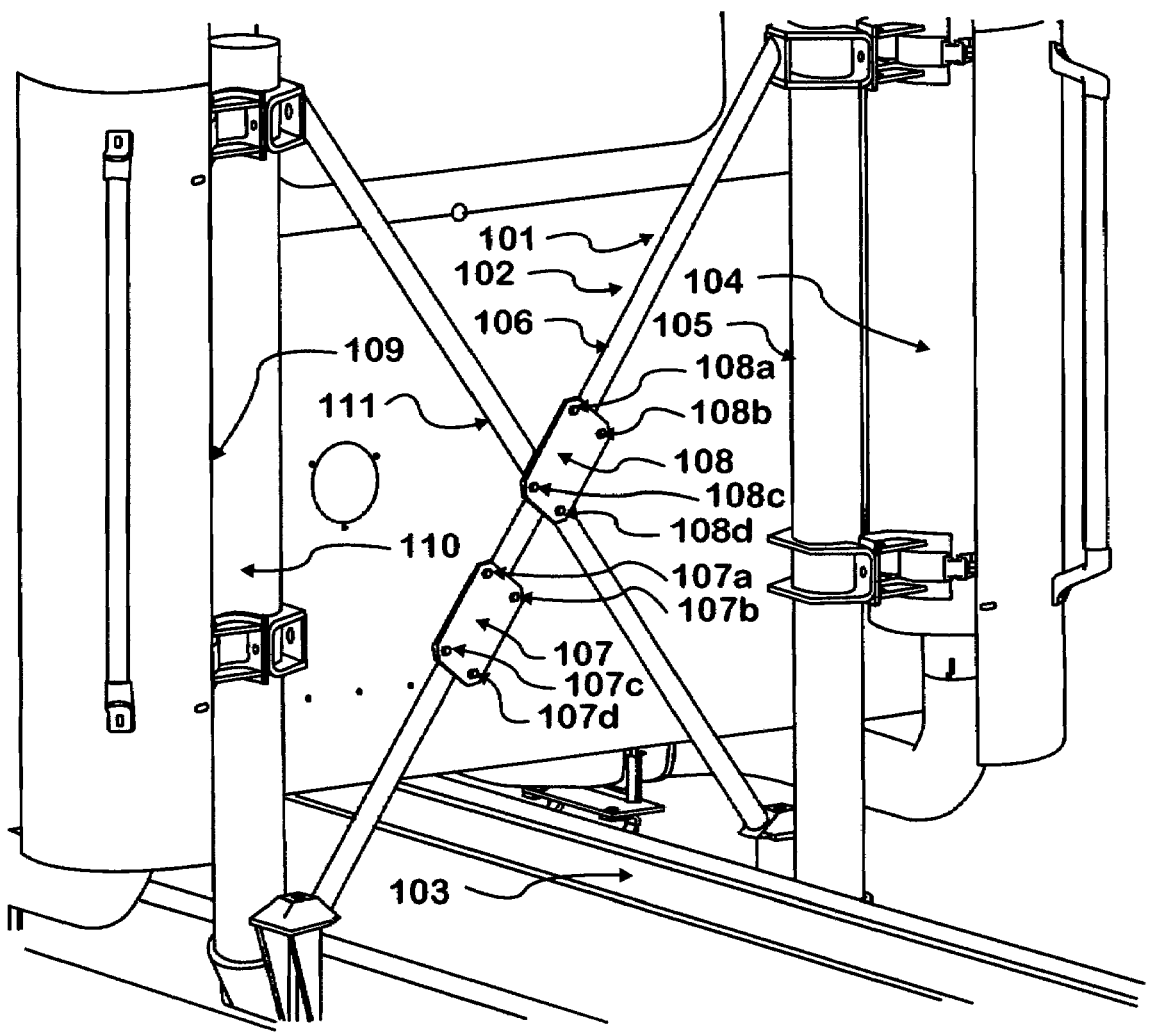

FIG. 2—A rear view of a vehicle made in accordance with a second embodiment of the invention.

Figure 3:
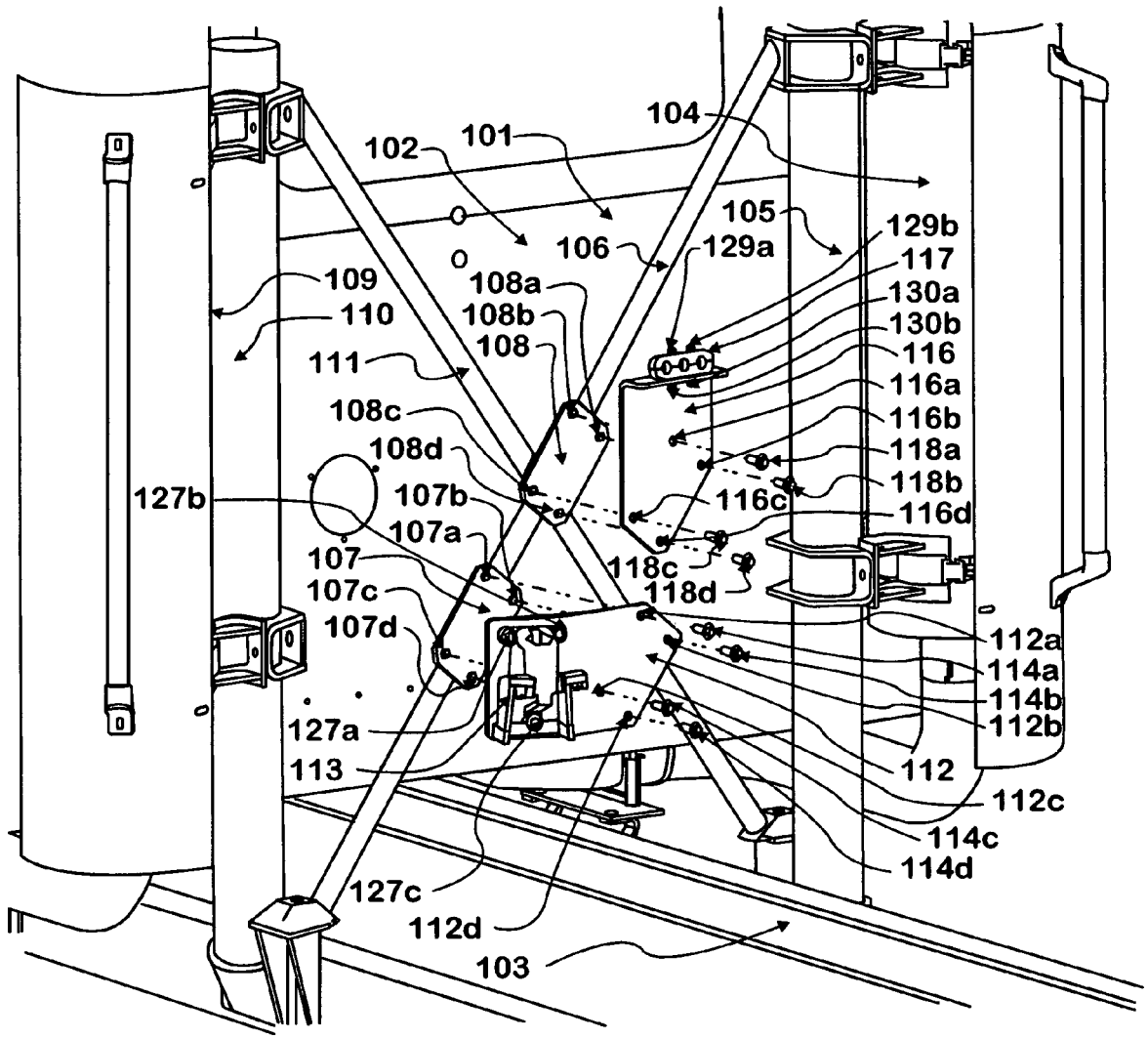

FIG. 3—A rear view of a vehicle made in accordance with a third embodiment of the invention.

Figure 4:
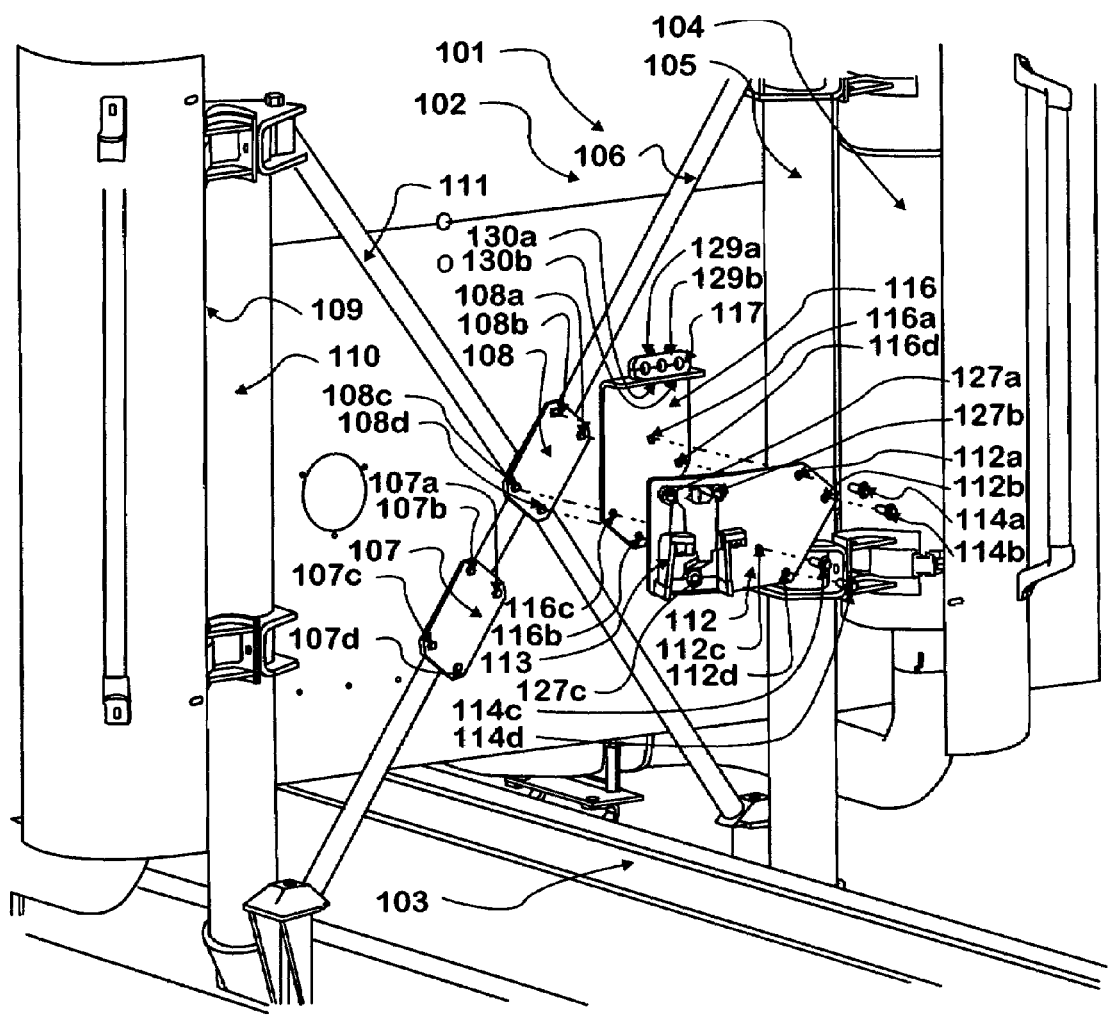

FIG. 4—A rear view of a vehicle made in accordance with a fourth embodiment of the invention.

Figure 5:
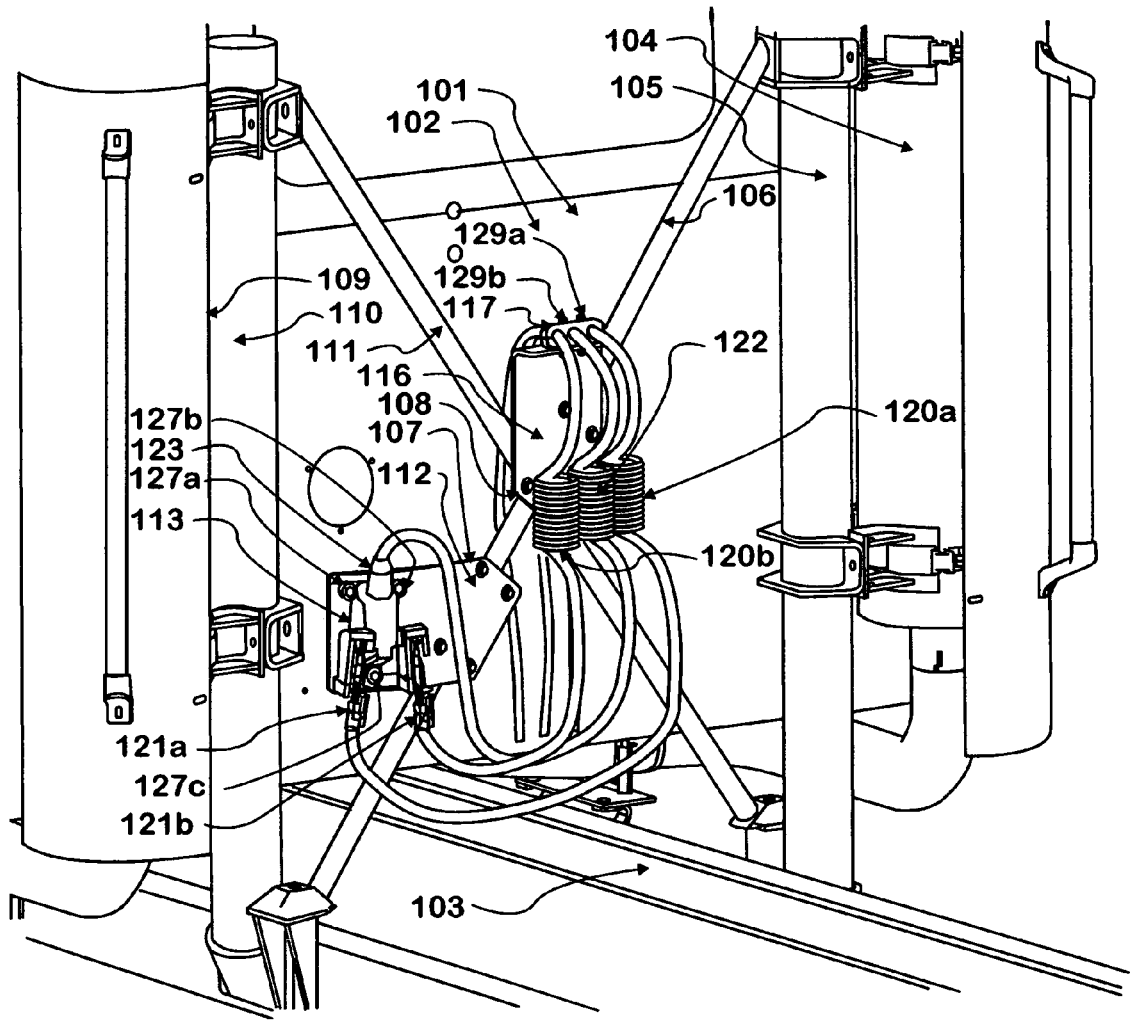

FIG. 5—A rear view of a vehicle made in accordance with a fifth embodiment of the invention.

Figure 6:
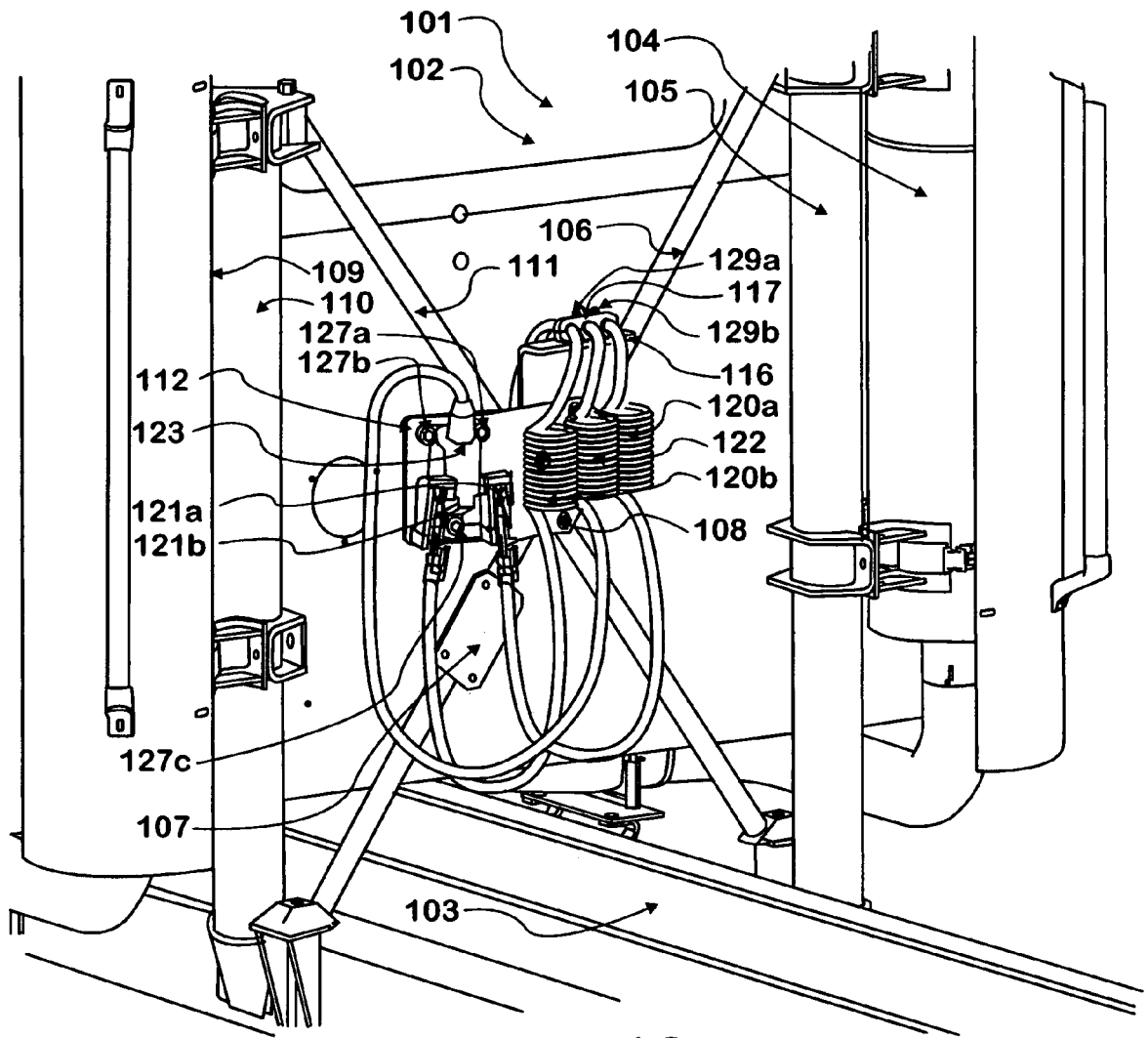

FIG. 6—A rear view of a vehicle made in accordance with a sixth embodiment of the invention.

Figure 7:
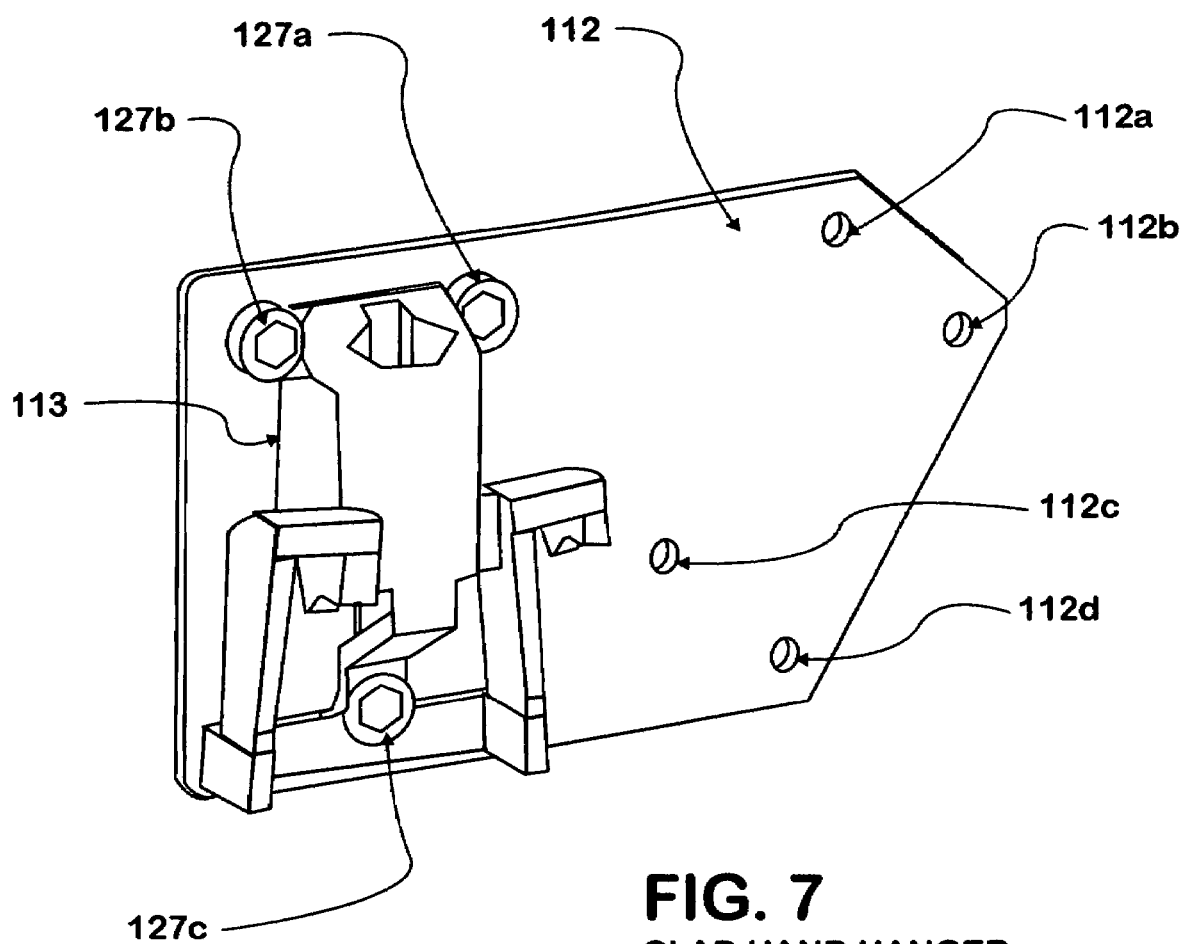

FIG. 7—A detailed view of the "glad hand" hanger bracket assembly.

Figure 8:
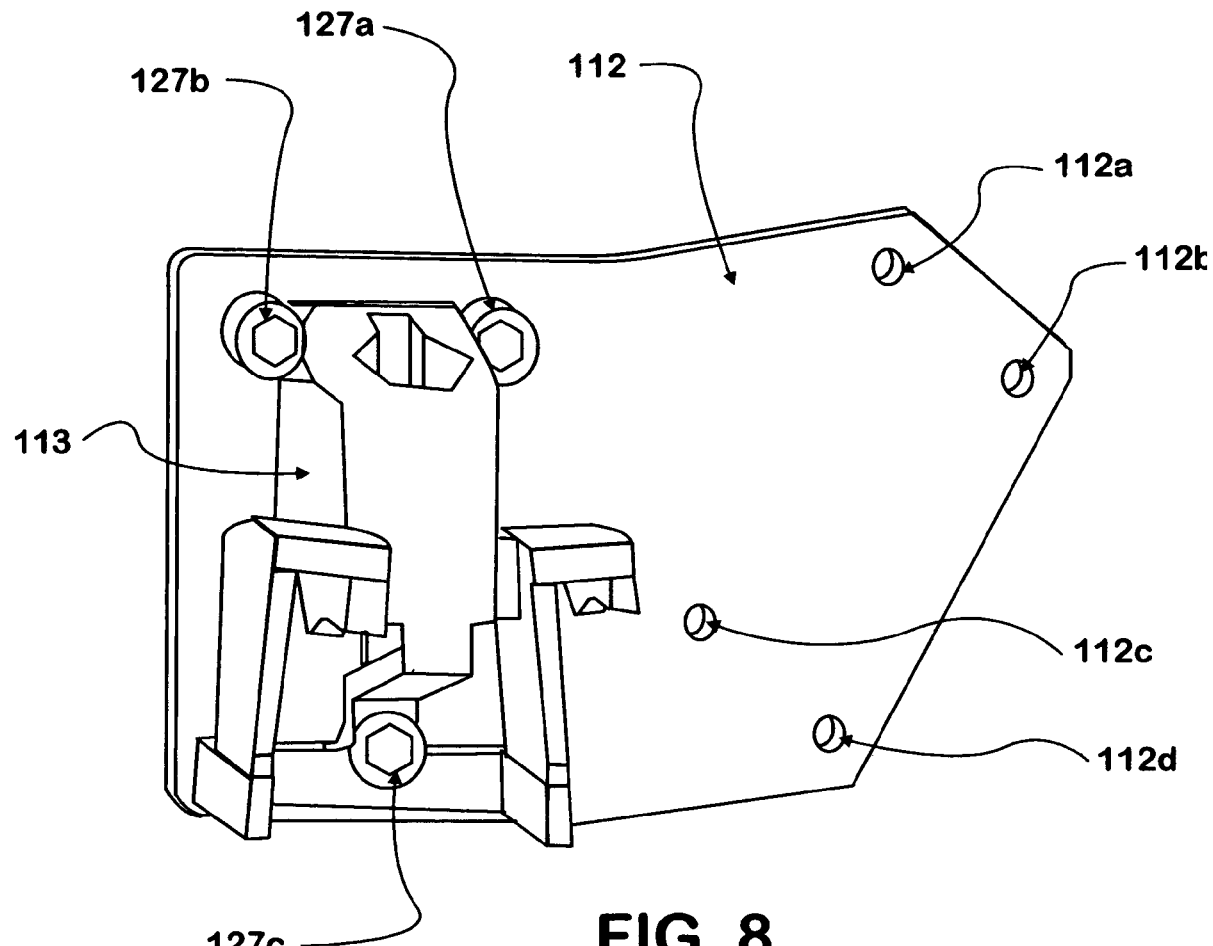

FIG. 8—A detailed view of a "glad hand" hanger bracket assembly having the "glad hand" hanger disposed at an ergonomic angle.

Figure 9:
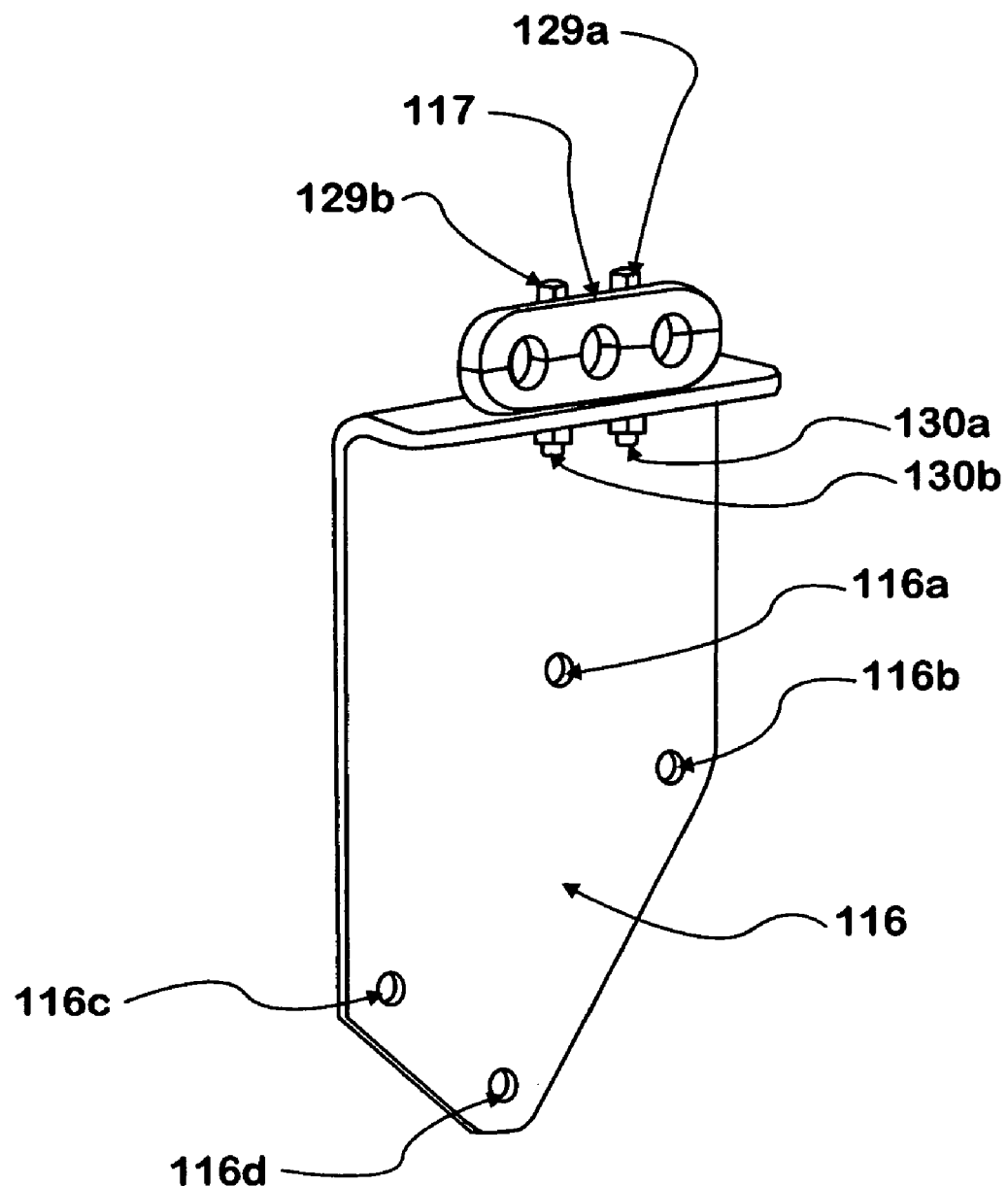

FIG. 9—A detailed view of the hose tender bracket assembly.

Figure 10:
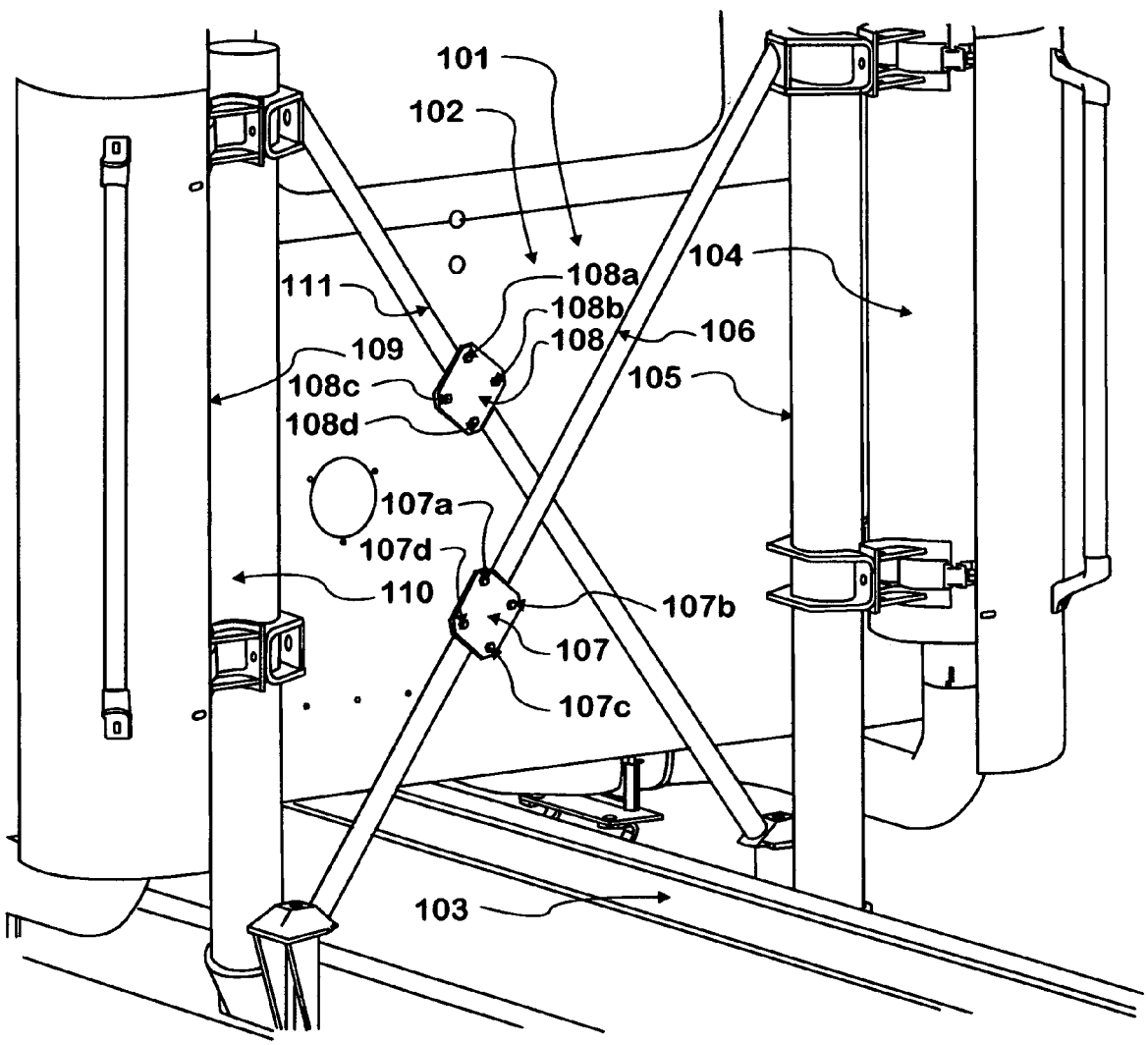

FIG. 10—A rear view of a vehicle made in accordance with a seventh embodiment of the invention.

Figure 11:
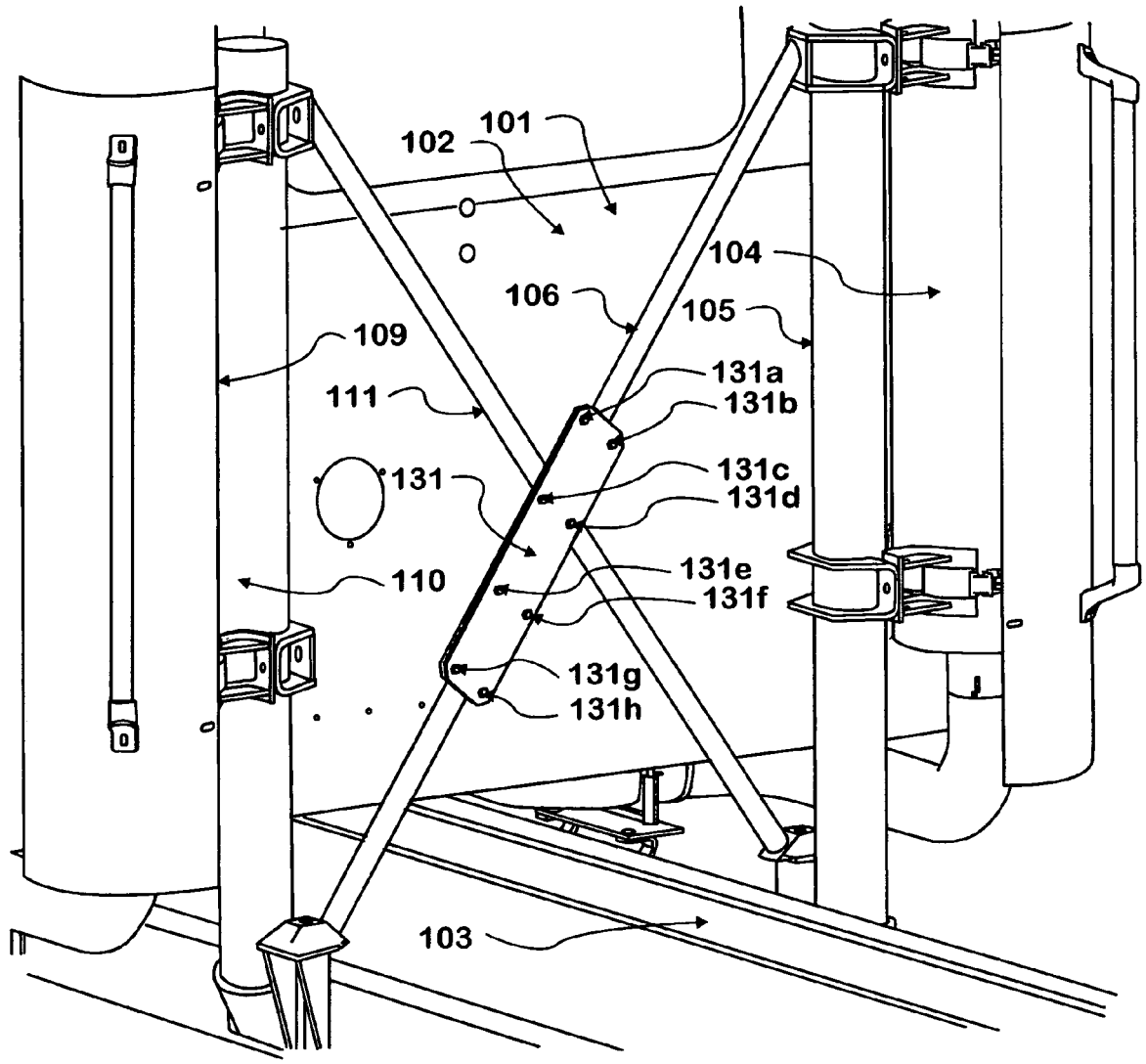

FIG. 11—A rear view of a vehicle made in accordance with an eighth embodiment of the invention.

Figure 12:
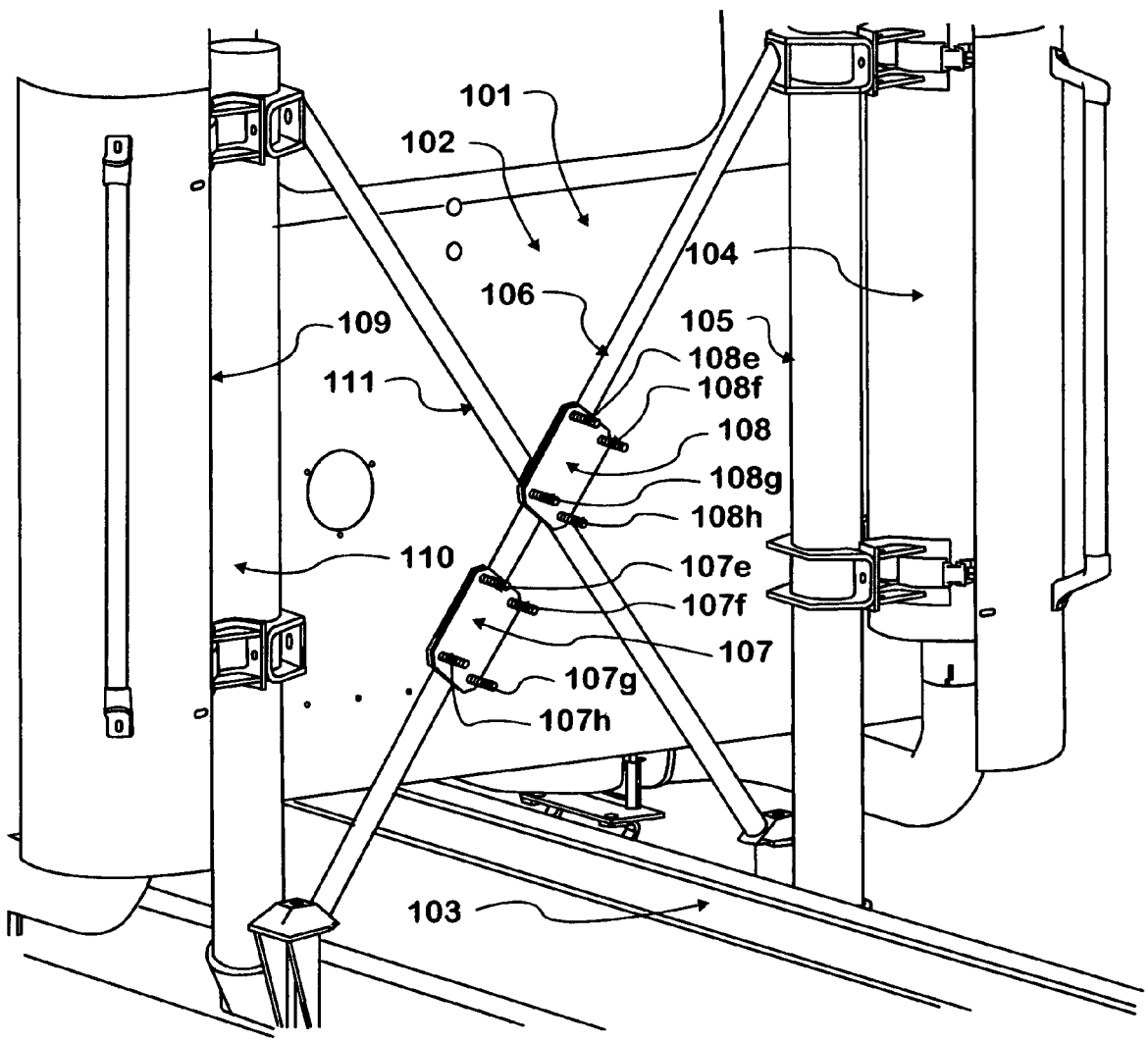

FIG. 12—A rear view of a vehicle made in accordance with a ninth embodiment of the invention.

Figure 13:
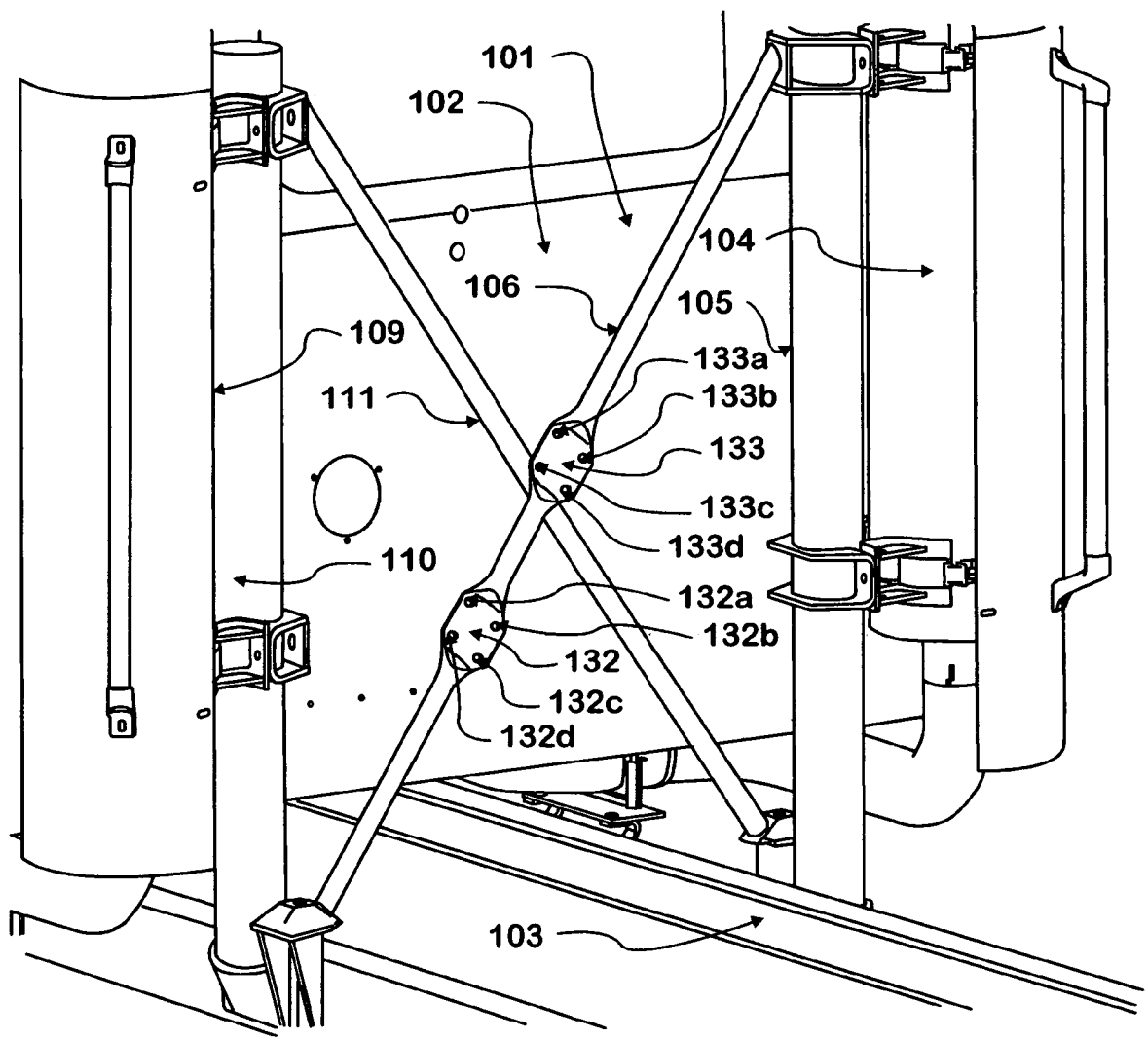

FIG. 13—A rear view of a vehicle made in accordance with a tenth embodiment of the invention.

DETAILED DESCRIPTION OF THE INVENTION

The vehicle 101 shown in FIG. 1 has a cab 102 engaged to a chassis 103. The chassis has a right hand exhaust stanchion 105 located rearward of the cab 102 relative to vehicle 101 forward movement, which serves to support the vehicle right hand exhaust 104. Attached to both the chassis 103 and the right hand exhaust stanchion 105 is a right hand exhaust stanchion brace 106, which serves to further support and stiffen the right hand exhaust stanchion 105. This right hand exhaust stanchion brace 106 is shown in a tubular embodiment, although it could take a number of cross sectional forms, such as an I-beam, L-angle, bar, or square. The right hand exhaust stanchion brace 106 is attached to the chassis 103 and the right hand exhaust stanchion 105 in such a way that it is positioned at an acute angle relative to the chassis 103 in a plane perpendicular to the vehicle 101 forward movement. A lower mounting plate 107 and an upper mounting plate 108 are shown attached to the right hand exhaust stanchion brace 106. The upper mounting plate 108 is attached to the right hand exhaust stanchion brace 106 at a point near the longitudinal centerline of the vehicle 101. The lower mounting plate 107 is attached to the right hand exhaust stanchion brace 106 at a point nearer to the point where the right hand exhaust stanchion brace 106 attaches to the chassis 103. Thus, it is located at a point lower and further to the left hand side of the vehicle 101 than is upper mounting plate 108. Both the lower mounting plate 107 and the upper mounting plate 108 in this embodiment are provided with four mounting plate fastener holes, 107a, 107b, 107c, and 107d for the lower mounting plate 107, and 108a, 108b, 108c, and 108d for the upper mounting plate 108. However, both lower mounting plate 107 and upper mounting plate 108 may be provided with more or less than four mounting plate fastener holes, as long as the number of holes and pattern in which they are disposed on the lower mounting plate 107 and upper mounting plate 108 are the same.

The vehicle 101 shown in FIG. 2 has a similar cab 102, chassis 103, vehicle right hand exhaust 104, right hand exhaust stanchion 105, right hand exhaust stanchion brace 106, lower mounting plate 107, upper mounting plate 108, and mounting plate fastener holes 107a, 107b, 107c, 107d, 108a, 108b, 108c, and 108d, as the vehicle 101 shown in FIG. 1. Additionally, FIG. 2 shows chassis 103 having a left hand exhaust stanchion 110 located to the rearward of the cab 102 relative to vehicle 101 forward movement, and opposite to right hand exhaust stanchion 105. The left hand exhaust stanchion 110 serves to support the vehicle left hand exhaust 109. Attached to both the chassis 103 and the left hand exhaust stanchion 110 is a left hand exhaust stanchion brace 111, which serves to further support and stiffen the left hand exhaust stanchion 110. Similar to the right hand exhaust stanchion brace 106, left hand exhaust stanchion brace 111 is shown in a tubular embodiment, although it could take a number of cross sectional forms, such as an I-beam, L-angle, bar, or square. The left hand exhaust stanchion brace 111 is attached to the chassis 103 and the left hand exhaust stanchion 110 in such a way that it is positioned at an acute angle relative to the chassis 103 in a plane perpendicular to the vehicle 101 forward movement, and symmetrically opposite to right hand exhaust stanchion brace 106. The lower mounting plate 107 and upper mounting plate 108 are shown attached to the right hand exhaust stanchion brace 106, similar to FIG. 1.

The vehicle 101 shown in FIG. 3 has a similar cab 102, chassis 103, vehicle right hand exhaust 104, vehicle left hand exhaust 109, right hand exhaust stanchion 105, left hand exhaust stanchion 110, right hand exhaust stanchion brace 106, left hand exhaust stanchion brace 111, lower mounting plate 107, lower mounting plate fastener holes 107a, 107b, 107c, and 107d, upper mounting plate 108, upper mounting plate fastener holes 108a, 108b, 108c, and 108d, as the vehicle 101 shown in FIG. 2. Additionally, FIG. 3 shows a "glad hand" and electrical connector hanger bracket 112 projected from its point of attachment to lower mounting plate 107. Projection lines are shown starting from "glad hand" and electrical connector hanger bracket mounting fasteners 114a, 114b, 114c, and 114d, passing through "glad hand" and electrical connector hanger bracket mounting fastener holes 112a, 112b, 112c, and 112d, and through lower mounting plate fastener holes 107a, 107b, 107c, and 107d. By means of this projection, the correct location and conventional means whereby "glad hand" and electrical connector hanger bracket 112 is attached to lower mounting plate 107 is disclosed. Furthermore, by means of "glad hand" and electrical connector hanger mounting fasteners 127a, 127b, and 127c, "glad hand" and electrical connector hanger 113 is attached to "glad hand" and electrical connector hanger bracket 112 in conventional manner. FIG. 3 also shows a hose tender bracket 116 projected from its point of attachment to upper mounting plate 108. Projection lines are shown starting from hose tender bracket mounting fasteners 118a, 118b, 118c, and 118d, passing through hose tender bracket mounting fastener holes 116a, 116b, 116c, and 116d, and through upper mounting plate fastener holes 108a, 108b, 108c, and 108d. By means of this projection, the correct location and conventional means whereby hose tender bracket 116 is attached to upper mounting plate 108 is disclosed. Furthermore, by means of hose tender mounting fasteners 129a and 129b, and hose tender mounting nuts 130a and 130b, hose tender device 117 is attached to hose tender bracket 116 in a conventional manner.

The vehicle 101 shown in FIG. 4 has a similar cab 102, chassis 103, vehicle right hand exhaust 104, vehicle left hand exhaust 109, right hand exhaust stanchion 105, left hand exhaust stanchion 110, right hand exhaust stanchion brace 106, left hand exhaust stanchion brace 111, lower mounting plate 107, lower mounting plate fastener holes 107a, 107b, 107c, and 107d, upper mounting plate 108, upper mounting plate fastener holes 108a, 108b, 108c, and 108d, as the vehicle 101 shown in FIG. 2 and FIG. 3. FIG. 4 also has a similar "glad hand" and electrical connector hanger bracket 112, "glad hand" and electrical connector hanger 113, hose tender bracket 116, and hose tender device 117. However, "glad hand" and electrical connector hanger bracket 112 is disposed in an overlapping manner with hose tender bracket 116. As a result, only one set of mounting fasteners, 114a, 114b, 114c, and 114d are needed. Projection lines are shown starting from mounting fasteners 114a, 114b, 114c, and 114d, passing through "glad hand" and electrical connector hanger bracket mounting fastener holes 112a, 112b, 112c, and 112d, through hose tender bracket mounting fastener holes 116a, 116b, 116c, and 116d, and through upper mounting plate fastener holes 108a, 108b, 108c, and 108d. By means of this projection, the correct optional location and conventional means whereby both "glad hand" and electrical connector hanger bracket 112 and hose tender bracket 116 is attached to upper mounting plate 108 is disclosed. Again, by means of "glad hand" and electrical connector hanger mounting fasteners 127a, 127b, and 127c, "glad hand" and electrical connector hanger 113 is attached to "glad hand" and electrical connector hanger bracket 112 in conventional manner. Furthermore, by means of hose tender mounting fasteners 129a and 129b, and hose tender mounting nuts 130a and 130b, hose tender device 117 is attached to hose tender bracket 116 in conventional manner.

Other permutations of the invention disclosed herein are possible, such as both "glad hand" and electrical connector hanger bracket 112 and hose tender bracket 116 both attached to lower mounting plate 107, or "glad hand" and electrical connector hanger bracket 112 attached to upper mounting plate 108 and hose tender bracket 116 attached to lower mounting plate 107.

Note also that "glad hand" and electrical connector hanger 113 is shown in these Figures in a typical embodiment, although other embodiments may be used, provided that the function of the hanger is to secure one or more releasably connectable fittings. Hose tender device 117 also is shown in a typical embodiment, although other embodiments may be used, provided that the function of the hose tender device is to flexibly support and retain hoses and electrical cables at or near their midpoints.

The vehicle 101 in FIG. 5 has a similar cab 102, chassis 103, vehicle right hand exhaust 104, vehicle left hand exhaust 109, right hand exhaust stanchion 105, left hand exhaust stanchion 110, right hand exhaust stanchion brace 106, left hand exhaust stanchion brace 111, lower mounting plate 107, "glad hand" and electrical connector hanger bracket 112, "glad hand" and electrical connector hanger 113, "glad hand" and electrical connector hanger mounting fasteners 127a, 127b, and 127c, upper mounting plate 108, hose tender bracket 116, hose tender device 117, hose tender mounting fasteners 129a and 129b, as FIG. 3. "Glad hand" and electrical connector hanger bracket 112 is attached to lower mounting plate 107, and hose tender bracket 116 is attached to upper mounting plate 108, similar to FIG. 3. Additionally, coiled trailer brake hoses 120a and 120b, and trailer electrical cable 122, are shown flexibly attached to hose tender device 117 in a conventional manner. Trailer brake hose "glad hand" fittings 121a and 121b, and trailer electrical cable connector 123 are shown attached to "glad hand" and electrical connector hanger 113 in a conventional manner.

The vehicle 101 in FIG. 6 has a similar cab 102, chassis 103, vehicle right and left hand exhaust, stanchion, and brace arrangement as FIG. 4. Both "glad hand" and electrical connector hanger bracket 112, and hose tender bracket 116 are attached to upper mounting plate 108, again similar to FIG. 4. Additionally, coiled trailer brake hoses 120a and 120b, and trailer electrical cable 122, are shown flexibly attached to hose tender device 117 in a conventional manner. Trailer brake hose "glad hand" fittings 121a and 121b, and trailer electrical cable connector 123 are shown attached to "glad hand" and electrical connector hanger 113 in a conventional manner.

FIG. 7 is a detailed view showing "glad hand" and electrical connector hanger bracket 112, "glad hand" and electrical connector hanger bracket mounting fastener holes 112a, 112b, 112c, and 112d, "glad hand" and electrical connector hanger mounting fasteners 127a, 127b, and 127c and "glad hand" and electrical connector hanger 113.

FIG. 8 is a detailed view showing "glad hand" and electrical connector hanger bracket 112, "glad hand" and electrical connector hanger bracket fastener holes 112a, 112b, 112c, and 112d, "glad hand" and electrical connector hanger mounting fasteners 127a, 127b, and 127c, and "glad hand" and electrical connector 113, similar to FIG. 7. However, the "glad hand" and electrical connector hanger bracket 112 shown in FIG. 8 is configured such that "glad hand" and electrical connector 113 is affixed to it at an angle less than ninety degrees from horizontal relative to "glad hand" and electrical connector hanger bracket 112's installed position on vehicle 101.

FIG. 9 is a detailed view showing hose tender bracket 116, hose tender bracket fastener holes 116a, 116b, 116c, and 116d, hose tender mounting fasteners 129a and 129b, and hose tender mounting nuts 130a and 130b, and hose tender device 117.

The vehicle 101 shown in FIG. 11 has a similar cab 102, chassis 103, vehicle right and left hand exhaust, stanchion, and brace arrangement as the vehicle 101 in FIG. 2. However, the vehicle 101 in FIG. 11 has one long mounting plate 131, in lieu of lower mounting plate 107 and upper mounting plate 108. Mounting plate 131 is shown in FIG. 11 having two groups of fastener holes, 131a, 131b, 131c, and 131d in the first group, and 131e, 131f, 131g, and 131h in the second group. As with lower mounting plate 107 and upper mounting plate 108, the number of holes in mounting plate 131 may be more or less than four in each group, provided that the number and pattern of holes is the same for each.

The vehicle 101 shown in FIG. 12 has a similar cab 102, chassis 103, vehicle right and left hand exhaust, stanchion, and brace arrangement as the vehicle 101 in FIG. 2. However, the lower mounting plate 107 is provided with four lower mounting plate studs, 107e, 107f, 107g, and 107h, in lieu of lower mounting plate fastener holes 107a, 107b, 107c, and 107d. In the same way, the upper mounting plate 108 is provided with four upper mounting plate studs, 108e, 108f, 108g, and 108h, in lieu of upper mounting plate fastener holes 108a, 108b, 108c, and 108d. As with the holes in the upper and lower mounting plates in FIG. 2, the lower mounting plate 107 and upper mounting plate 108 may be provided with more or less than four studs each, as long as the number of studs and spacing between them is similar in each plate.

The vehicle 101 shown in FIG. 13 has a similar cab 102, chassis 103, vehicle right and left hand exhaust, stanchion, and brace arrangement as the vehicle 101 in FIG. 2. However, the right hand exhaust stanchion brace 106 shown in FIG. 13 has additional features, which render upper mounting plate 107 and lower mounting plate 108 unnecessary for implementation of the invention. Specifically, right hand exhaust stanchion brace 106 possesses one or more integrated flat mounting surfaces, in this case right hand exhaust stanchion brace lower flat mounting surface 132 and right hand exhaust stanchion brace upper flat mounting surface 133. The lower flat mounting surface 132 is provided with lower flat mounting surface fastener holes 132a, 132b, 132c, and 132d. Similarly, the upper flat mounting surface 133 is provided with upper flat mounting surface fastener holes 133a, 133b, 133c, and 133d. As with the other embodiments of this invention, more or less fastener holes may be used, as long as the number of fastener holes and distance between them is the same for each flat mounting surface. Additionally, the lower and upper flat mounting surfaces 132 and 133 may be disposed upon left hand exhaust stanchion brace 111, or may be disposed upon both left and right hand exhaust stanchions 106 and 111.

As described above, the mounting system for securing brake hoses and electrical cables located to the rearward of a mobile vehicle cab and a vehicle 101 with this system installed provide a number of advantages, some of which have been described above and others of which are inherent in the invention. Also, modifications may be proposed to the mounting system for securing brake hoses and electrical cables located to the rearward of a mobile vehicle cab and a vehicle 101 with this system installed with these components installed without departing from the teachings herein.

We claim:

1. A mobile vehicle for operation on the ground, comprising:
   - a cab attached to a chassis;
   - a vertical support member attached to said chassis and located to the rearward of said cab relative to said mobile vehicle forward movement;
   - a brace attached to said chassis and to said vertical support member, positioned at an acute angle relative to said chassis in a plane approximately perpendicular to said mobile vehicle forward movement;
   - a plurality of mounting plates attached to said brace, having at least two mounting features in each of said mounting plates, and having similar spacing between said mounting features;
   - a first bracket detachably mounted to one of said mounting plates, having at least two compatible mounting features with similar spacing between said mounting features as those in said mounting plates;
   - a first device for flexibly supporting hoses or cables, attached to said first bracket;
   - a second bracket detachably mounted to one of said mounting plates, having at least two compatible mounting features with similar spacing between said mounting features as those in said mounting plates, said compatible mounting features optionally allowing said second bracket to be superimposed over said first bracket; and
   - a second device for removably affixing at least one connector, attached to said second bracket.

2. The mobile vehicle of claim 1, wherein:
   said vertical support member is located on one side of said chassis relative to said mobile vehicle forward movement;
   one of said mounting plates is attached to said brace at a point near the longitudinal centerline of said chassis; and
   another of said mounting plates is attached to said brace at a point lower and nearer to the opposite side of said chassis from said vertical support member.

3. The mobile vehicle of claim 1, wherein:
   said mounting features in said mounting plates further comprise holes; and
   said compatible mounting features in said first bracket and said second bracket further comprise holes.

4. The mobile vehicle of claim 1 wherein:
   said second device for removably affixing said at least one connector is attached to said second bracket at an angle less than ninety degrees from horizontal within a plane approximately perpendicular to said mobile vehicle forward movement.

* * * * *